United States Patent [19]

Harrison

[11] Patent Number: 4,609,138
[45] Date of Patent: Sep. 2, 1986

[54] METHOD OF MANUFACTURING INJECTION MOLDING MANIFOLD WITH PLUGS

[75] Inventor: Arthur Harrison, Milton, Canada

[73] Assignee: Mold-Masters Limited, Georgetown, Canada

[21] Appl. No.: 803,158

[22] Filed: Dec. 2, 1985

[30] Foreign Application Priority Data

Nov. 22, 1985 [CA] Canada ................................. 495832

[51] Int. Cl.⁴ .............................................. B23K 33/00
[52] U.S. Cl. ................................... 228/161; 228/168;
228/174; 425/572; 425/588; 29/157 R; 29/157 A; 29/157 T
[58] Field of Search ............... 228/160, 161, 170, 174, 228/168; 425/572, 570, 542, 588; 29/157 R, 157 A, 157 T, 157 C

[56] References Cited

U.S. PATENT DOCUMENTS

| | | | |
|---|---|---|---|
| 3,775,836 | 12/1973 | Jackson et al. | 228/168 |
| 3,791,026 | 2/1974 | Dufrene et al. | 228/168 |
| 4,043,740 | 8/1977 | Gellert | 425/572 |
| 4,333,629 | 6/1982 | Roy | 425/572 |
| 4,433,969 | 2/1984 | Gellert | 425/572 |
| 4,500,030 | 2/1985 | Gerber et al. | 228/168 |
| 4,511,528 | 4/1985 | Kudert et al. | 425/572 |

FOREIGN PATENT DOCUMENTS 1174020 9/1984 Canada ................................. 425/572

Primary Examiner—Nicholas P. Godici
Assistant Examiner—Samuel M. Heinrich
Attorney, Agent, or Firm—Riches, McKenzie & Herbert

[57] ABSTRACT

This invention relates to an improved method of manufacturing injection molding manifolds for multicavity molding. The method includes gun drilling a longitudinal duct through a steel manifold body, drilling a transverse inlet duct to connect to an inlet on one surface of the manifold, and drilling diagonal outlet ducts to connect to spaced outlets on the opposite surface of the manifold. The outlet ducts are smaller in diameter than the longitudinal duct to match the rest of the system. Before the outlet ducts are drilled, end portions of the longitudinal duct are drilled out to a larger diameter and steel plugs having a tapered well are securely welded into them with the mouth of the well in alignment with the longitudinal duct. The plugs are larger in diameter than the central portion of the longitudinal duct to avoid the formation of thin knife edge portions where the outlet ducts join the longitudinal duct which often break down during use. The smaller diameter outlet duct is then drilled diagonally to intersect the well in the plug at its smaller blind end. The joint is then smoothly finished to remove any irregularities and provide a smooth transition between the larger diameter longitudinal duct and the smaller diagonal outlet ducts at each end.

5 Claims, 4 Drawing Figures

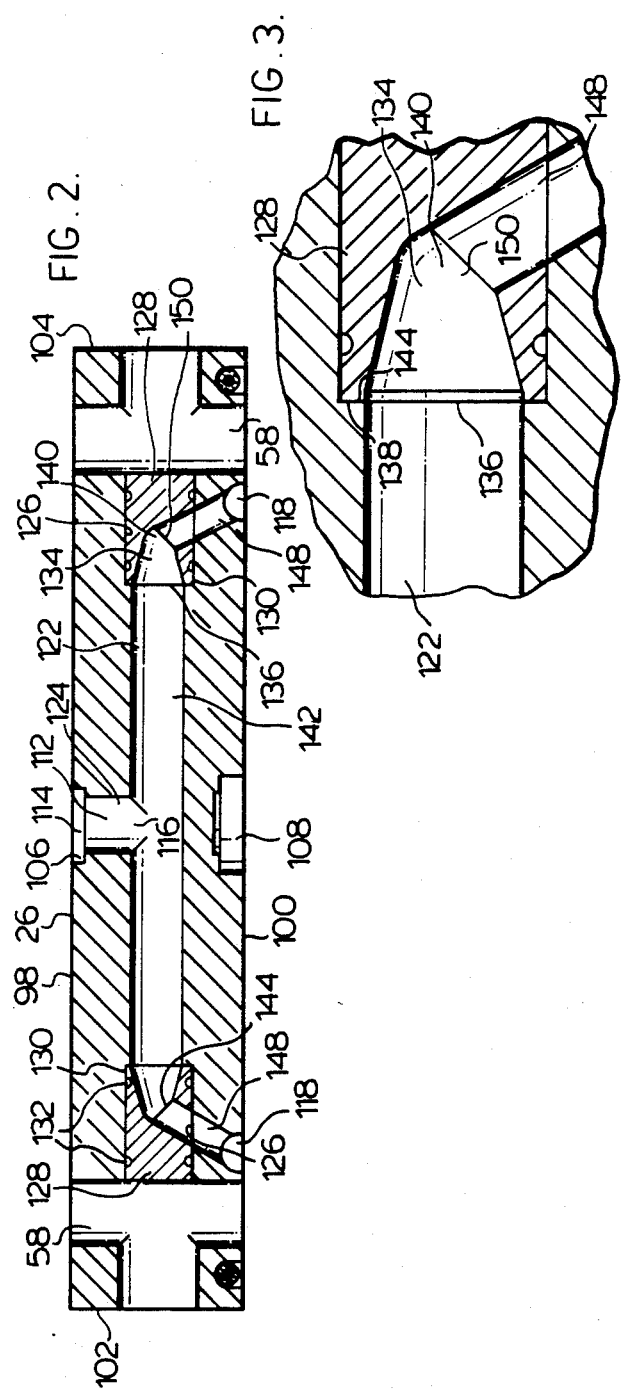

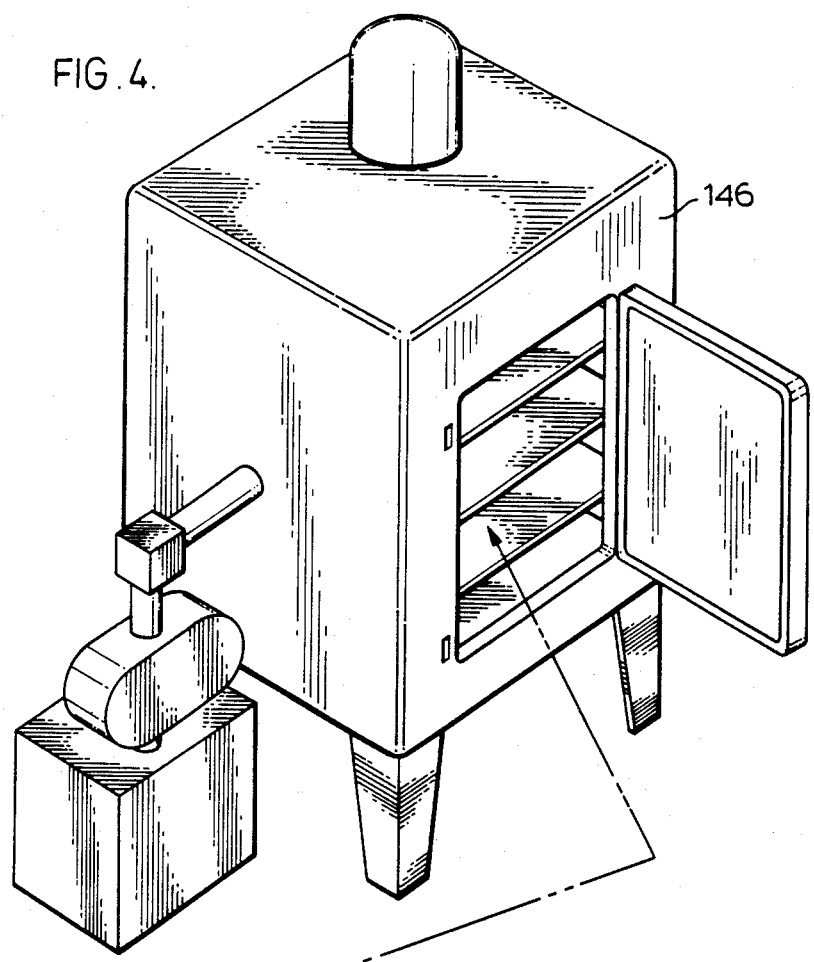
FIG. 4.
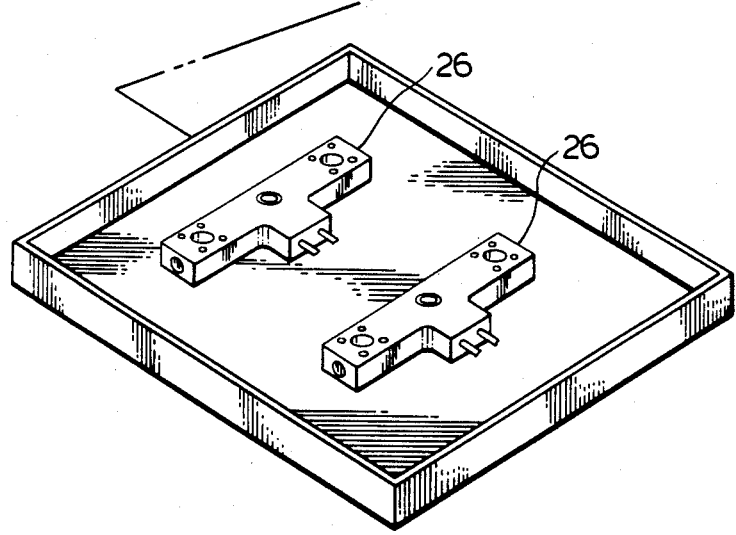

METHOD OF MANUFACTURING INJECTION MOLDING MANIFOLD WITH PLUGS

This invention relates generally to injection molding and more particularly to an improved method of manufacturing an injection molding manifold in which the hot runner passage branches from a single central inlet to a number of smaller diameter spaced outlet ducts.

Normally, these manifolds have an elongated rectangular body with the inlet centrally located on one surface and a pair of outlets located towards the outer ends of the opposite surface. They are made by drilling a duct longitudinally through the manifold body, blocking the ends of the longitudinal duct by welding plugs into them, and then drilling transverse ducts to connect the longitudinal duct to the inlet and outlets. An example of a manifold made by this method, but having more than one longitudinal duct to provide more than a pair of outlets is shown in FIG. 1 of Gellert's U.S. patent application Ser. No. 725,799 filed Apr. 22, 1985 entitled "Composite Plate Method of Manufacturing Injection Molding Manifold". While manifolds made by this method are satisfactory for some relatively easy to mold materials, they are not acceptable for some other materials. As is well known when molding some engineering materials such as polyvinyl chloride and some flame retardent polymers, causing the pressurized melt to flow around sharp corners in the melt flow passage creates shearing of the melt. This can result in decomposition of the material which lowers the quality of the molded product. Furthermore, too many right angle melt flow turns in the hot runner passage results in unacceptable pressure drop of the melt flowing to the cavities.

It is necessary that the outlets have a predetermined diameter to match the rest of the system, but it is desirable that the inlet duct and the longitudinal duct have a larger diameter to reduce pressure drop of the melt. However, using this previous method, it is necessary to laboriously manually finish the joints between the longitudinal duct and the outlet ducts to provide a smooth transition between them.

Another problem with manifolds produced by this previous method is that drilling into the plug to form the transverse duct leading to the outlet forms a knife edge portion at each intersection with the longitudinal duct. This knife edge often breaks down during use and forms an irregularity which disrupts the smooth flow of the melt.

Yet another problem with this previous method is that occasionally the welds fail and the pressurized melt leaks around the plug or the plug comes out.

SUMMARY OF THE INVENTION

Accordingly, it is an object of the present invention to at least partially overcome the disadvantages of the prior art by providing a method of manufacturing a manifold in which the steel plugs each having a concentric tapered well are vacuum cast or brazed into larger diameter end portions of the longitudinal duct. The well has a mouth in alignment with the longitudinal duct and the outlet ducts are drilled diagonally to connect with the smaller blind end of the wells to provide a smooth transition.

To this end, in one of its aspects, the invention provides a method of manufacturing an injection molding manifold having a body with first and second parallel opposing surfaces and first and second opposing ends, the manifold having a hot runner passage which extends from a central inlet on said one surface and branches out from an upstream portion at at least one junction to a plurality of spaced outlets on said second surface, the outlets being smaller in diameter than the inlet, comprising the steps of forming the manifold body of a suitable steel to predetermined dimensions; drilling a longitudinal duct longitudinally through the manifold body from the first end to the second end, the longitudinal duct having a predetermined diameter and extending parallel to the first and second surfaces; drilling a transverse inlet duct to form said upstream portion of the hot runner passage, the transverse duct extending from the inlet to centrally intersect the longitudinal duct to form the junction; drilling the longitudinal duct adjacent each end of the manifold body to form enlarged diameter end portions extending from a central portion of the longitudinal duct, each enlarged diameter end portion joining the central portion of the longitudinal duct at a circumferential shoulder; forming a pair of cylindrical steel plugs to fit into the end portions of the longitudinal duct, each plug having a cylindrical outer surface with at least one circumferential groove extending therearound, and a concentric well extending partially therethrough, the well tapering inwardly from a mouth at one end to a smaller blind end, the mouth being substantially equal in diameter to the central portion of the longitudinal duct; locating brazing material in each of the circumferential grooves, inserting one of the steel plugs into each of the end portions of the longitudinal duct with the said one end abutting against one of the circumferential shoulders and the mouth of the well in alignment with the central portion of the longitudinal duct, and heating the manifold in a vacuum furnace for a sufficient period of time and at a temperature whereby the brazing material melts and flows around the cylindrical outer surface of the plug to securely fix the plug into the respective end portion of the longitudinal duct and seal against leakage of pressurized melt around the plug; drilling a pair of diagonal outlet ducts which are smaller in diameter than the central portion of the longitudinal duct, each diagonal duct extending through the manifold body and plug to connect one of the outlets on the second surface of the manifold body to the blind end of the well in a respective one of the plugs; and smoothly finishing the joint thereby provided in each of the plugs between the longitudinal duct and the respective diagonal outlet duct.

Further objects and advantages of the invention will appear from the following description taken together with the accompanying drawings.

BRIEF DESCRIPTION OF THE DRAWINGS

FIG. 2 is a sectional view of the manifold seen in FIG. 1;

FIG. 3 is an enlarged sectional view of a portion of the manifold seen in FIGS. 1 and 2; and FIG. 4 shows manifolds in position on trays for insertion into a vacuum furnace.

DETAILED DESCRIPTION OF THE DRAWINGS

Figure 1:
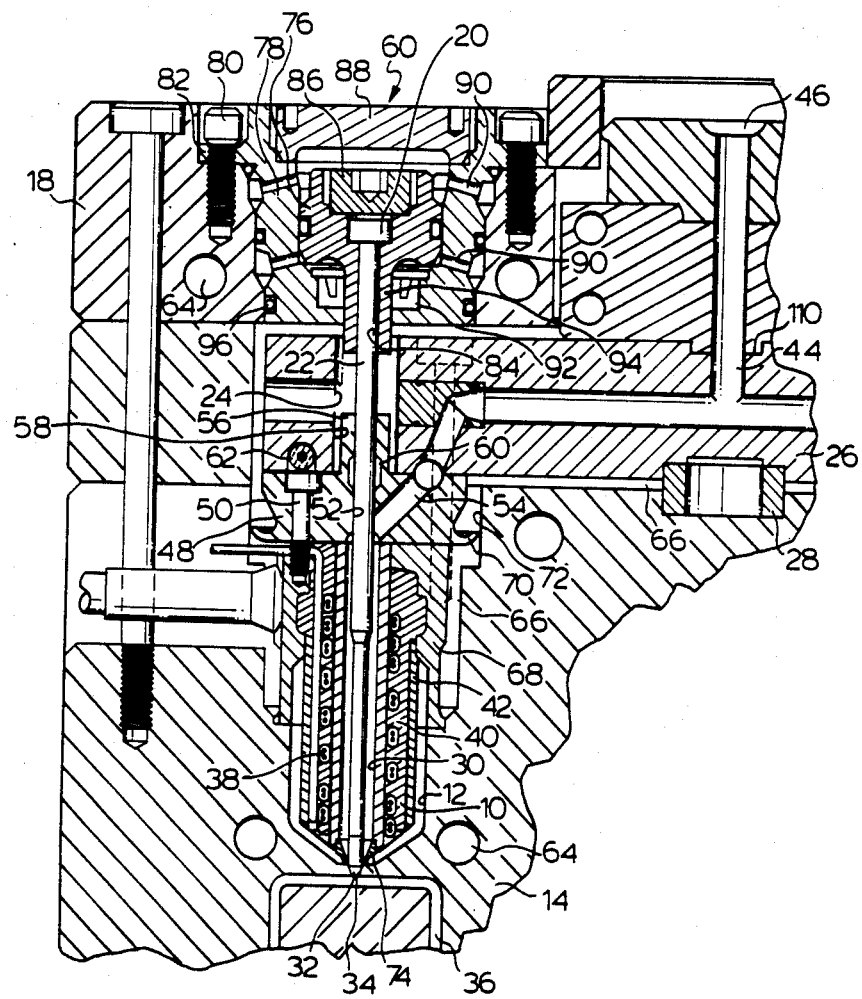
FIG. 1 is a partial sectional view of a portion of an injection molding system having a manifold according to a preferred embodiment of the invention.

Reference is first made to FIG. 1 which shows one cavity of a multi-cavity valve gated hydraulically actuated injection molding system. A nozzle 10 is seated in a well 12 in the cavity plate 14, and hydraulic actuating mechanism is seated in the back plate 18. The actuating mechanism engages the driven end 20 of a valve pin 22 which extends through an opening 24 in the manifold 26 which is located in position between the cavity plate 14 and back plate 18 by locating ring 28. The valve pin extends through a central bore 30 in the nozzle 10 and has a tip end 32 in alignment with the gate 34 in the cavity plate 14 leading to the cavity 36.

The nozzle 10 has an integral structure with a helical electric heating element 38 cast in copper 40 inside a steel body 42. The copper is very thermally conductive and it is bonded to the heating element 38 and steel body 42 to rapidly disperse the heat from the heating element and provide a uniform temperature along the length of the central bore 30. The helical heating element 38 has a flattened configuration and a varying pitch to assist in avoiding a build up to higher temperatures in the middle of the nozzle 10. The stainless steel body 42 is more corrosion and abrasion resistant than the copper to withstand the corrosive effects of the melt and the surrounding gases from decomposing melt.

The system has a hot runner passage 44 which extends from a recessed inlet 46 and branches out in the manifold 26 to lead to the nozzles 10 where it runs through the central bore around the valve pin 22. As described in Gellert's U.S. Pat. No. 4,433,969 which issued Feb. 28, 1984, the nozzle 10 has a steel valve bushing 48 which is securely fastened to it by bolts 50. The steel valve bushing 48 also has a central bore 52 which is in alignment with the central bore 30 of the nozzle 10. The hot runner passage 44 extends through a diagonal melt duct 54 which joins the central bore 52 adjacent the nozzle 10. Of course, the central bore 52 of the bushing must snugly receive the valve pin 22 and be long enough to prevent leakage of the pressurized melt around the reciprocating valve pin 22. Thus, the valve bushing 48 has a collar portion 56 which extends into an opening 58 in the manifold 26. Clearance is provided around the collar portion 56 so that it is not displaced as a result of thermal expansion of the manifold. The bore 52 through the valve bushing 48 is interrupted by a circumferential opening 60 which is vented to atmosphere. This relieves pressure and allows corrosive gases to escape which are formed by the decomposition of melt which is trapped around the valve pin and subjected to shearing action by the reciprocal motion of the valve pin.

Each nozzle 10 is heated by the heating element 38 and the manifold 26 is heated by a heating element 62 which will be described in more detail below. As will be appreciated it is critical that the melt in the hot runner passage 44 be maintained in a narrow operating temperature range until it reaches the gate 34, despite the cyclical interruptions in its flow. On the other hand, the cavity plate 14 and the back plate 18 in which the hydraulical actuating mechanism 16 is seated are cooled by water flowing through cooling channels 64 in a conventional manner. In order to maintain this temperature relationship, an insulative air space 66 is provided between the hot and cool components by the locating ring 28 and the insulation bushing 68 on which the nozzle 10 is seated in the well 12. As may be seen, metal to metal contact is minimized to reduce heat loss. For example, the steel valve bushing 48 has only a narrow locating flange 70 in contact with wall 72 of the well 12. Melt temperature in the gate area is particularly critical and a hollow nozzle seal 74 formed of a titanium alloy is provided to bridge the air space around the gate 34 to prevent leakage of pressurized melt. As described in Gellert's U.S. Pat. No. 4,043,740 which issued Aug. 23, 1977, this seal also conducts a desired amount of heat from the nozzle 10 to the cavity plate directly around the gate 34 which maintains proper seating of the valve pin tip end 32 in the gate to provide superior gating, performance and cosmetics.

The valve pin actuating mechanism 16 includes a hydraulically driven piston 76 which reciprocates in a cylinder 78. The cylinder is seated in the back plate 18 and is secured in alignment with the valve pin 22 by bolts 80 extending through a collar portion 82. The valve pin 22 extends through a hole 84 in the piston 76 and is secured to it by a threaded plug 86 which is screwed into the piston in a sealed position above the enlarged driven end 20 of the valve pin. The cylinder has a removable cap 88 which is larger in diameter than the piston 76 so that the piston and valve pin 22 can be removed if necessary. Pressurized hydraulic fluid is applied through ducts 90 to the cylinder 78 on opposite sides of the piston from a controlled source (not shown) to actuate the piston according to a predetermined cycle. A V-shaped high temperature seal 92 extending around the neck 94 of the piston 76 and several O-rings 96 prevent leakage of the pressurized hydraulic fluid.

The elongated manifold 26 is generally rectangular in shape and is formed of a suitable tool steel. As seen in FIGS. 2 and 3, the manifold 26 is formed to have a pair of generally flat parallel surfaces 98,100 extending between the opposite ends 102,104. Of course, recesses 106,108 are provided in the surfaces 98,100 to receive the inlet collar 110 and locating ring 28. In this embodiment, transverse opening 58 are provided through the manifold 26 to receive the collar portion 56 of the bushing 48 and the neck 94 of the piston 76. The hot runner passage 44 extends through the manifold 26 with an upstream portion 112 which extends from an inlet 114 on one surface 98 to a junction 116 where it branches to a pair of spaced outlets 118 on the other surface 100. As mentioned above, it is critical to the successful operation of the system with certain materials that melt flow through the hot runner passage be streamlined as much as possible and that pressure drop be minimized. Thus, it is very desirable to eliminate stagnant material and sharp and rough corners in the hot runner passage. The problem of melt pressure drop as it flows through the manifold is further alleviated by enlarging the diameter of a portion of the hot runner passage through the manifold. However, the diameter of the outlets 118 cannot be increased as well because it must match the diameter of the melt duct 54 through the valve bushing 48 and the central bore 30 through the nozzle 10. It will be appreciated that providing a smooth joint or transition between the larger and smaller diameter ducts is very difficult. While it can be done by manual finishing, this is much too laborious to be acceptable.

After the manifold is machined to this desired shape, an elongated longitudinal duct 122 is gun drilled through it extending parallel to the surfaces 98,100 between the two ends 102, 104. A transverse inlet duct 124 is then drilled from the inlet 114 to intersect the longitudinal duct 122 at junction 116. The diameter of the longitudinal duct 122 and inlet duct 124 depend upon the volume of melt flow required for the particular application, but is larger than the diameter of the outlets 118 to reduce melt pressure drop. After the longitudinal duct 122 has been drilled to the desired diameter, end portions 126 adjacent each end 102,104 are drilled again to each receive a larger diameter steel plug 128.

The plugs 128 are made with a generally cylindrical outer surface 130 having two spaced grooves 132 extending circumferentially around it. A concentric hole or well 134 is then machined in each plug to taper inwardly from a mouth 136 at one end 138 to a smaller blind end 140. The mouth 136 of the well 134 is equal in diameter to the central portion 142 of the longitudinal duct 122.

A ring of copper wire is placed in each groove 132 and the plugs 128 are inserted into the enlarged end portion 126 of the longitudinal duct 122 until the end 138 of each plug abuts against the circumferential shoulder 144 formed where the enlarged end portions 126 join the smaller diameter central portion 142 of the longitudinal duct. In this position, the mouth 136 is in alignment with the central portion 142 of the elongated duct 122. An electrical heating element 62 is then located in a groove in one of the surfaces 98,100 and prepared for casting in copper as disclosed in Gellert's Canadian Pat. No. 1,174,020 which issued Sept. 11, 1984. The manifold 26 is then placed in a vacuum furnace 146 (shown in FIG. 4) and heated for a sufficient period of time and at a temperature to melt the copper to fill the space around the heating element 62 and the rings of copper wire which then flows around the outer circumferential surfaces 130 of the plugs. Then, when the manifold is cooled, a thermally conductive bond is formed between the heating element and the manifold and the plugs 128 are securely brazed into position in the end portions 126 of the longitudinal duct 122 which seals it against leakage of the pressurized melt. Following installation of the plugs 128, a pair of diagonal outlet ducts 148 are drilled through the manifold body 120 and plug 128 to intersect the smaller diameter blind end 140 of the plug at an oblique angle to connect each end of the longitudinal duct 122 to one of the outlets 118 on the surface 100 of the manifold body. As can be seen, the diagonal outlet ducts 148 are smaller in diameter than the longitudinal duct 122 to match the melt duct 54 through the valve bushing 48 and the central bore 30 through the nozzle 10. The joints 150 at the blind ends 140 of the plugs 128 between the larger diameter longitudinal duct and the smaller diameter diagonal outlet ducts 142 are then smoothly finished to remove burrs and to avoid an irregularities which would otherwise interrupt the streamlined flow of the melt. As may clearly be seen in FIG. 3, after the joints 150 have been finished to remove any irregularities, providing this preformed tapered well 134 in each plug provides a relatively smooth transition from the larger diameter longitudinal duct 122 to the smaller diameter outlet ducts 148. It will be appreciated that providing the tapered wells 134 in the plugs 128 very considerably reduces the amount of very difficult finishing which would otherwise be required. Thus, a manifold 26 made by this method has the advantage that there is less pressure drop through it because the diameter of the hot runner passage is increased throughout most of its flow through the manifold, without introducing the problem of irregular melt flow where the diameter is reduced to match the rest of the system. This method has the advantage that only one step is required to provide an isothermic heat source for the manifold and to avoid a labour intensive welding operation at a place that is difficult to weld.

The plugs 128 are larger in diameter than the central portion 142 of the elongated duct. As mentioned above, the end 138 of each plug abuts against circumferential shoulder 144 and drilling the outlet ducts 146 on the diagonal avoids the formation of thin knife edge portions which otherwise frequently break down and form an unacceptable irregularity right at the flow corner. While transverse valve pin openings 58 are also drilled through the manifold in this embodiment, this step is not necessary to form a similar manifold for sprue gating where no provision for the valve pin is required.

In use, the system is assembled as described above and electrical power is applied to the terminals of the heating elements 38 and 62 to heat the nozzle and manifold to a predetermined operating temperature. Pressurized melt is then introduced into the hot runner passage 44 from a molding machine according to a predetermined cycle in conjunction with the application of hydraulic pressure to the actuating mechanism. When the valve pin 22 is withdrawn, melt flows through the manifold 26 where it branches out and flows through each of the nozzles 10 and fills the cavities 36. After the cavities are filled, high injection pressure is held momentarily to pack and then the valve pin is actuated to the closed position with the tip end 32 seated in the gate 34. Melt pressure is then reduced and after a short cooling period the mold opens for ejection. The mold then closes, injection pressure reapplied and the sequence is repeated at a rate of several cycles per minute.

While the description of this system has been given with respect to particular embodiments, it is not to be construed in a limiting sense. Variations and modifications will occur to those skilled in the art. In particular, it is apparent that the dimensions of the manifold body 120 and the diameters of the various ducts will vary depending upon the particular system design. Furthermore, the manifold body 120 may have a different configuration such as cross or H-shaped rather than elongated, in which case the upstream portion 112 of the hot runner passage 44 leading to the junction 116 will connect to another duct in the manifold rather than the inlet. While different manifold shapes will be required for different types of gating, the basic method of making them will remain the same. Reference is made to the attached claims for a definition of the invention.

What I claim is:

1. A method of manufacturing an injection molding manifold having a body with first and second parallel opposing surfaces and first and second opposing ends, the manifold having a hot runner passage which extends from a central inlet on said one surface and branches out from an upstream portion at at least one junction to a plurality of spaced outlets on said second surface, the outlets being smaller in diameter than the inlet, comprising the steps of:
    (a) forming the manifold body of a suitable steel to predetermined dimensions;
    (b) drilling a longitudinal duct longitudinally through the manifold body from the first end to the second end, the longitudinal duct having a predetermined diameter and extending parallel to the first and second surfaces;
    (c) drilling a transverse inlet duct to form said upstream portion of the hot runner passage, the transverse duct extending from the inlet to centrally intersect the longitudinal duct to form the junction;
    (d) drilling the longitudinal duct adjacent each end of the manifold body to form enlarged diameter end portions extending from a central portion of the longitudinal duct, each enlarged diameter end portion joining the central portion of the longitudinal duct at a circumferential shoulder;

(e) forming a pair of cylindrical steel plugs to fit into the end portions of the longitudinal duct, each plug having a cylindrical outer surface with at least one circumferential groove extending therearound, and a concentric well extending partially therethrough, the well tapering inwardly from a mouth at one end to a smaller blind end, the mouth being substantially equal in diameter to the central portion of the longitudinal duct;

(f) locating brazing material in each of the circumferential grooves, inserting one of the steel plugs into each of the end portions of the longitudinal duct with the said one end abutting against one of the circumferential shoulders and the mouth of the well in alignment with the central portion of the longitudinal duct, and heating the manifold in a vacuum furnace for a sufficient period of time and at a temperature whereby the brazing material melts and flows around the cylindrical outer surface of the plug to securely fix the plug into the respective end portion of the longitudinal duct in order to effect a seal against leakage, during injection molding, of pressurized melt around the plug;

(g) drilling a pair of diagonal outlet ducts which are smaller in diameter than the central portion of the longitudinal duct, each diagonal duct extending through the manifold body and plug to connect one of the outlets on the second surface of the manifold body to the blind end of the well in a respective one of the plugs; and (h) smoothly finishing the junction thereby created in each of the plugs between the longitudinal duct and the respective diagonal outlet duct.

2. A method as claimed in claim 1 wherein the manifold body is formed to be elongated and the hot runner passage is formed to have a pair of spaced outlets on the second surface of the manifold body, and the transverse inlet duct is drilled to extend from the inlet on the first surface of the manifold body to intersect the longitudinal duct centrally between the first and second ends of the manifold body.

3. A method as claimed in claim 1 wherein the manifold body is formed to have a cross or H-shaped configuration and the transverse inlet duct extends to connect the longitudinal duct to another upstream portion of the hot runner passage extending from the inlet on the first surface of the manifold body.

4. A method as claimed in claim 1 comprising the further step of drilling a transverse valve pin opening through the manifold body adjacent each of the ends thereof.

5. A method as claimed in claim 1 wherein an electrical heating element is located in a groove in one of the first and second surfaces of the manifold body and step (f) includes casting copper around the heating element to form an integral bond with the manifold body.

* * * * *